United States Patent [19]
Akamatsu

[11] 3,803,465
[45] Apr. 9, 1974

[54] DC POWER CONTROL SYSTEM FOR PLURAL MOTORS

[75] Inventor: Masahiko Akamatsu, Amagasaki, Japan

[73] Assignee: Mitsubishi Denki Kabushiki Kaisha, Tokyo, Japan

[22] Filed: Sept. 29, 1971

[21] Appl. No.: 184,713

[52] U.S. Cl. .................................. 318/95, 318/111
[51] Int. Cl. ............................................. H02p 1/54
[58] Field of Search ............................. 318/95, 111

[56] References Cited
UNITED STATES PATENTS
3,369,162   2/1968   Torii ................................. 318/111
2,970,250   1/1961   Hibbard ..................... 318/111 X Primary Examiner—T. E. Lynch
Attorney, Agent, or Firm—Wenderoth, Lind & Ponack

[57] ABSTRACT

A d.c. power control device capable of being switched between two control stages. The device employs two power control stages each controlled in accordance with the current carrying ratios of choppers included in the stages The switching operation between the two control stages is performed by a switching device comprising at least one diode and at least one switching element. The current carrying ratios of the choppers are also controlled in response to the ON-OFF operations of the switching element.

6 Claims, 10 Drawing Figures

3,803,465

$1/2 > t_{ON}/T$ $1/2 < t_{ON}/T$

MASAHIKO AKAMATSU,
INVENTOR

BY *Wendroth, Lind & Ponack*

ATTORNEYs

MASAHIKO AKAMATSU,
INVENTOR

ATTORNEYS

DC POWER CONTROL SYSTEM FOR PLURAL MOTORS

BACKGROUND OF THE INVENTION

1. Field of the Invention

This invention relates to improvements in a d.c. power control device capable of being smoothly switched between two voltage control stages.

2. Description of the Prior Art

To reduce the power requirements of a d.c. power control device by half, there has been proposed a system wherein two power control stages are selectively used by switching the circuit connections. In the first condition of the circuit connections, the partial loads involved are brought into a series relationship, thereby to control the load voltage within the range of from 0 to one-half of the total source voltage. In the second condition of the circuit connections, the partial loads are brought into a parallel relationship, thereby to control the load voltage within the range of from one-half to the total source voltage. Therefore, in order to control the load voltage within the full power control range of from 0 to the total source voltage, it is required to switch the circuit connections between the first and the second conditions of the circuit connections. With the conventional d.c. power control device of such a type, however, the load current flowing through the partial loads changes abruptly or is instantaneously interrupted upon switching the circuit connections for switching between the first and the second voltage control ranges.

SUMMARY OF THE INVENTION

Accordingly, an object of the present invention is to provide a d.c. power control device capable of performing a smooth switching operation between two circuit conditions while causing the load current to flow without interrupting the load current.

Another object of the invention is to provide a d.c. power control device capable of controlling the power within the respective first and second voltage control stages in which the power is controlled within the ranges of from 0 to one-half and of from one-half to the total source voltage while smoothly and continuously performing the switching operation.

Still another object of the invention is to provide a d.c. power control device which has a small rate of variation of the load current and/or voltage and is capable of performing a smooth and continuous switching operation.

BRIEF DESCRIPTION OF THE DRAWING

The invention will become more readily apparent from the following description taken in conjunction with the accompanying drawings, in which:

FIG. 3 is a control characteristic diagram for explaining the operation of the d.c. power control device of FIGS. 1 and 1a;

Throughout several Figures the same reference characters designate identical or corresponding components.

DESCRIPTION OF THE PREFERRED EMBODIMENTS

Figure 1:
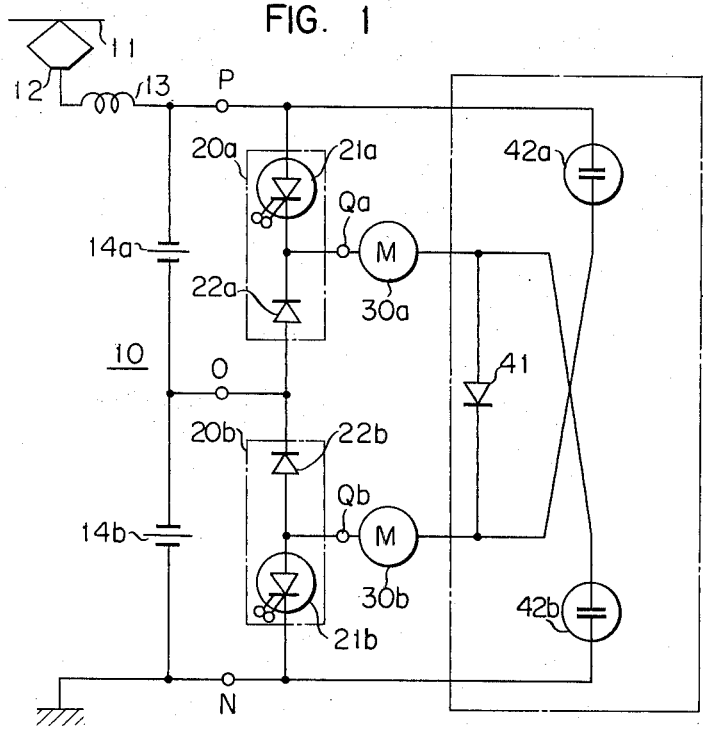
FIG. 1 is a circuit diagram showing one embodiment of the device of the present invention.

Referring now to the drawings and in particular to FIG. 1 thereof, one embodiment of the present invention is illustrated in the Figure as being applied to a d.c. power control device for controlling electric motors on an electric vehicle. A feeder line 11 supplies electric power to the system through a pantagraph 12 and a filter reactor 13. The electrical power supplied from the feeder line 11 is divided into two equal halves by a circuit of two series connected filter capacitors 14a and 14b having a positive terminal P, a negative terminal N and an intermediate terminal O. It will be understood that these three terminals P, O and N can be considered as output terminals of an unillustrated d.c. power source. Therefore, these components for supplying electrical power to the system are generally designated by the reference numeral 10 in the Figure.

Between the positive and intermediate terminals P and O is connected a power control unit 20a composed of a chopper 21a of the well known type and a diode 22a and having an end terminal Qa at the junction between the elements. Between the intermediate and negative terminals O and N is connected a power control unit 20b composed of a series connected chopper 21b and a diode 22b and having an end terminal Qb at the junction between the chopper 21b and the diode 22b. The chopper 21a and the diode 22a are so oriented with respect to the positive and negative poles that output power is provided at the end terminal Qa, while the chopper 21b and the diode 22b are so oriented that current is supplied from the end terminal Qb.

The end terminal Qa is connected to one end of a partial load illustrated as being an electric motor 30a, and the end terminal Qb is connected to one end of another partial load illustrated as being an electric motor 30b, the other end of both the motors 30a and 30b being connected to a switching device generally designated as 40, which is composed of a diode 41 connected between the other end terminals of the motors 30a and 30b and oriented in the direction from the motor 30a to the motor 30b, and two switching elements 42a and 42b connected between the motor 30b and the positive terminal P and the motor 30a and the negative terminal N respectively.

Figure 1A:
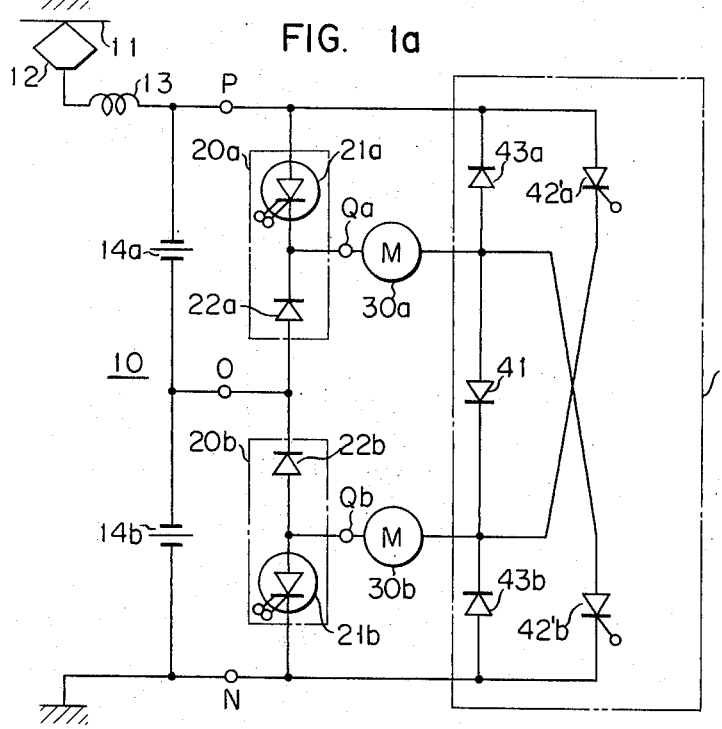
FIG. 1a is a circuit diagram similar to FIG. 1 showing a slightly modified device of the present invention.

If it is desired, the switching elements 42a and 42b can be replaced by thyristors 42'a and 42'b illustrated in FIG. 1a, thereby to eliminate any mechanical contacts from the circuit.

Figure 2A:
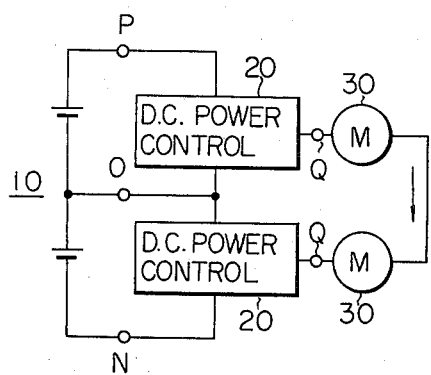
FIGS. 2a and 2b are schematic circuit diagrams useful for explaining the present invention and illustrating the circuit connections for the power control and for the regenerative power control respectively.

When both the switching elements 42a and 42b are in their OFF states, the motors 30a and 30b are connected in a series relationship through the diode 41. This circuit connection is schematically illustrated in FIG. 2a. Under these circumstances, the load current flows in the direction of the arrow shown in solid lines in FIG. 2a. More specifically, (I) when the chopper 21a is placed in the ON state with the chopper 21b in the OFF state, the current supplied from the d.c. source 10 flows through an electrical path composed of the positive terminal P, the chopper 21a, the motor 30a, the diode 41, the motor 30b, the diode 22b and the intermediate terminal O. (II) When the chopper 21b is placed in the ON state with the chopper 21a in the OFF state, the current flows through an electrical path composed of the intermediate terminal O, the diode 22a, the motor 30a, the diode 41, the motor 30b, the chopper 21b and the negative terminal N. (III) When both the choppers 21a and 21b are placed in the ON state, the current flows through an electrical path composed of the positive terminal P, the chopper 21a, the motor 30a, the diode 41, the motor 30b, the chopper 21b and the negative terminal N. (IV) When both the choppers 21a and 21b are in the OFF states, no current is supplied to the motors 30a and 30b, but motor current recirculates through an electrical path composed of the diode 22a, the motor 30a, the diode 41, the motor 30b and the diode 22b.

Figure 1B:
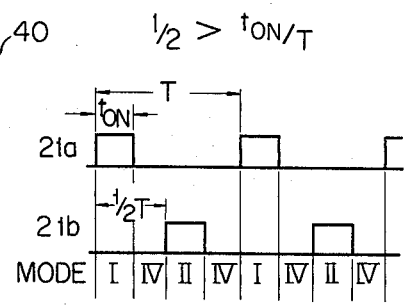
FIGS. 1b and 1c are diagrams illustrating the relationships of the firing cycles of the choppers to the circuit connection modes for the circuit of FIG. 1.
Figure 1C:
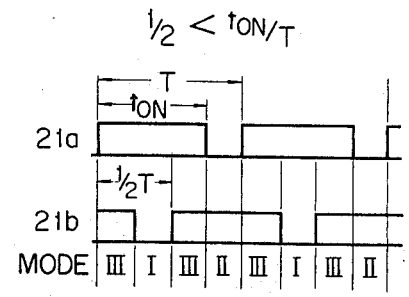

It will be readily understood that if the choppers 21a and 21b are fired and extinguished in a common cycle and with a time difference equal to one-half of the period of time T of the cycle, as illustrated diagrammatically in FIGS. 1b and 1c, the four circuit connection modes as described above occur. That is, in case the ratio of the period of time $t_{ON}$ during which the choppers are in the ON states to the period of time T of the cycle is smaller than one-half (i.e., one-half $> t_{ON}/T$), the circuit connection modes I, II and IV occur. In case the ratio $t_{ON}/T$ is greater than one-half (i.e., one-half $< t_{ON}/T$), the circuit connection modes I, II and III occur. Since the ratio of the duration of each of the four modes to the period of time of the cycle varies in proportion to the current carrying ratio of the choppers 21a and 21b, the mean supply voltage for the motors 30a and 30b can be controlled within the power control range of from 0 to one-half of the total source voltage.

Figure 2B:
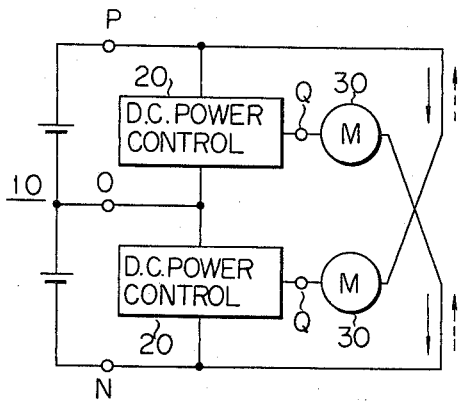

When both the switching elements 42a and 42b are switched to their ON states, the motors 30a and 30b are connected in a parallel relationship through the switching elements 42a and 42b as schematically shown in FIG. 2b. In this case, owing to the diode 41 shown in FIG. 1, the short-circuit of the power source through the positive terminal P, the switching element 42a, the diode 41, the switching element 42b and the negative terminal N is prevented. Under these circumstances, the load current flows in the direction of the arrows shown in solid lines in FIG. 2b. More specifically, when the chopper 21a alone is placed in its ON state with the chopper 21b OFF, the current supplied from the d.c. power source 10 flows through an electrical path composed of the positive terminal P, the chopper 21a, the motor 30a, the switching element 42b and the negative terminal N, and another parallel electrical path composed of the positive terminal P, the switching element 42a the motor 30b the diode 22b and the intermediate terminal O. When the chopper 21b alone is placed in its ON state, the current flows through two parallel electrical paths, one composed of the intermediate terminal O, the diode 22a, the motor 30a, the switching element 42b and the negative terminal N, and the other composed of the positive terminal P, the switching element 42a, the motor 30b, the chopper 21b, and negative terminal N. When both the choppers 21a and 21b are placed in the ON state at the same time the current flows through two parallel electrical paths, one composed of the positive terminal P, the chopper 21a the motor 30a the switching element 42b and the negative terminal N, and the other composed of the positive terminal P, the switching element 42a, the motor 30b, the chopper 21b and the negative terminal N. When both the choppers 21a and 21b are placed in the OFF state at the same time, the current flows through an electrical path composed of the positive terminal P, the switching element 42a, the motor 30b, the diode 22b, the diode 22a, the motor 30a, the switching element 42b and the negative terminal N. The above-described four circuit connection modes are repeated in order as in the case of the circuit connections shown in FIG. 2b. Therefore, the mean supply voltage for the motors 30a and 30b is controlled within the control range of from one-half to the total source voltage in proportion to the current carrying ratios of the choppers 21a and 21b.

Upon turning the switching elements 42a and 42b ON and OFF, since the commutation of the current takes place between these switching elements and the diode 41, the load current flowing through the motors 30a and 30b is not interrupted, enabling the continuous and smooth control of the electrical power within the control range of from 0 to all of the source voltage.

Upon turning the switching elements 42a and 42b OFF from their ON states, it is known that a current difference, although it is only a slight difference, appears between the motors 30a and 30b. For example, if the load current flowing through the switching element 42a and the motor 30b is greater than that flowing through the switching element 42b and the motor 30a, and if both the switching elements 42a and 42b are turned OFF simultaneously, the current flowing through the motor 30a commutates from the switching element 42b to flow through the diode 41, while the current flowing through the motor 30b does not completely commutate from the switching element 42a to flow through the diode 41, and the current difference between those two current continues to flow through the switching element 42a as an arc between the contacts thereof due to an excess voltage appearing across the switching element 42a.

Accordingly, especially when the thyristors 42'a and 42'b illustrated in FIG. 1a are used as the switching elements, diodes 43a and 43b are preferably connected between the other end of the motor 30a and the positive terminal P and the other end of the motor 30b and the negative terminal N. While these diodes are shown only for the circuit of FIG. 1a, it will be understood that they can also be used in the circuit of FIG. 1. The diodes 43a and 43b permit the above-mentioned current difference to flow therethrough for a short period of time during which the currents flowing through the motors 30a and 30b become equal to one another, whereby the switching voltage as above described is reduced to within the value of the source voltage to eliminate the generation of an arc across the switching elements.

Figure 3:
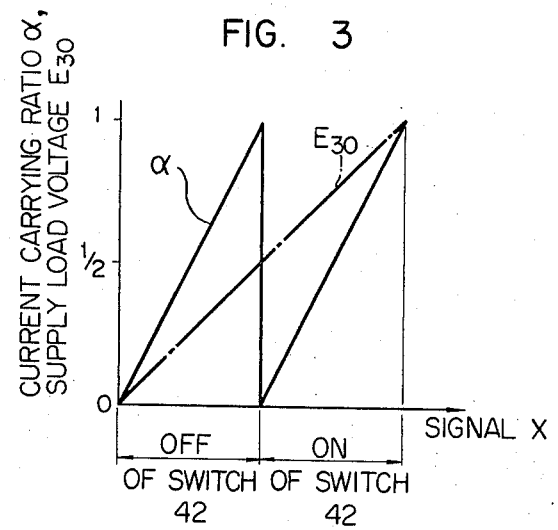

In order to prevent sharp variations in the load voltages, certain relationships are provided between the current carrying ratio $\alpha$ of the choppers 21a and 21b, the ON-OFF operation of the switching elements 42a and 42b, the supply load voltage $E_{30}$ for the motors 30a and 30b and a control signal X for the motors 20 as shown in FIG. 3. From the Figure, it is seen that the current carrying ratio α of the choppers 21a and 21b gradually increases from 0 to 1 while the switching elements 42a and 42b are in their OFF states, thereby to control the load voltage $E_{30}$ from 0 to one-half of the source voltage. Simultaneously with the turning ON of the switching elements 42a and 42b i.e., upon switching the load voltage control range, the current carrying ratio α of the choppers 21a and 21b is almost instantaneously reset from 1 to 0 by any suitable control means. Thereafter, the current carrying ratio α of the choppers again gradually increases from 0 to 1, thereby to control the load voltage $E_{30}$ from one-half to the total source voltage during the time the switching elements 42a and 42b are ON. Thus the load voltage control can be smoothly and continuously performed within the voltage control range of from 0 voltage to the full voltage.

The control means for controlling the choppers 21a and 21b involved in the d.c. power control units 20a and 20b in response to the operation of the switching elements 42a and 42b as illustrated in FIG. 3 will be readily arranged by those skilled in the art. For example, the control characteristic as illustrated in FIG. 3 can be provided by a circuit including a relay operable in response to the ON-OFF operation of the switching elements 42a and 42b or a relay for turning the switching elements 42a and 42b ON-OFF, the relay being connected to control means for the choppers 21a and 21b.

Figure 4:
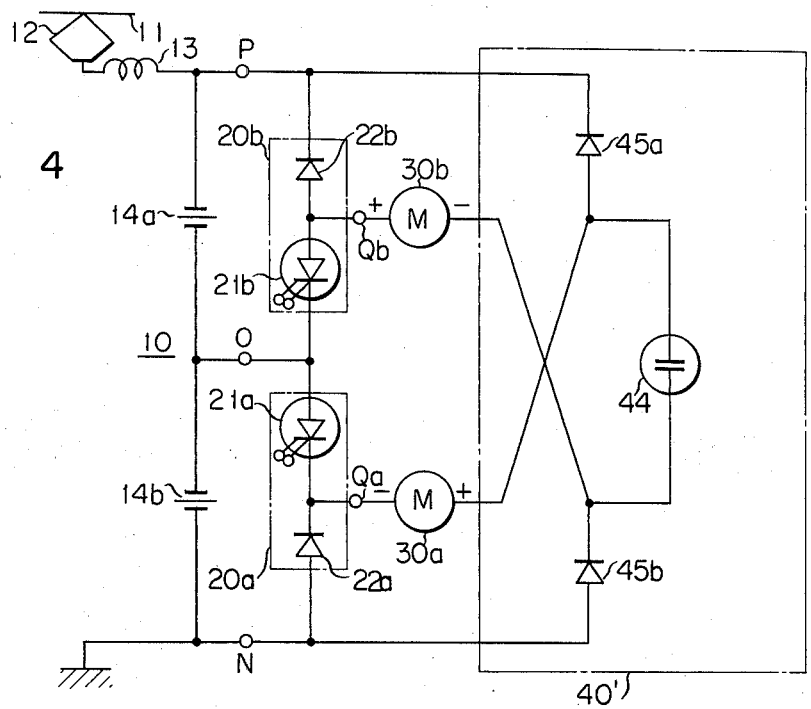
FIGS. 4 and 5 are circuit diagrams showing modifications of the device of the present invention.

Referring now to FIG. 4, wherein another embodiment of the present invention applied to a d.c. power regenerative control device is illustrated, it is seen that the circuit is the same as the power control device shown in FIG. 1 except for switching device 40' and the positions of the power control units 20a and 20b and the motors 30a and 30b.

The switching device 40' comprises a switching element 44 connected between the other terminals of the motors 30a and 30b, and diodes 45a and 45b connected between the other terminal of the motor 30a and the positive terminal P and between the other terminal of the motor 30b and the negative terminal N respectively. The diode 45a is so oriented that the current flows from the motor 30a to the positive terminal P, while the diode 45b is oriented for current flow from the negative terminal N to the motor 30b. It should be noted that the switching element 44 can be replaced by a thyristor (not shown) for eliminating any mechanical contacts from the circuit in the same manner as the switching elements 42a and 42b of FIG. 1 can be replaced.

The power control unit 20a shown in FIG. 1 is connected between the positive terminal P and the intermediate terminal O. However, the power control unit 20a of the circuit shown in FIG. 4 is connected between the intermediate terminal O and the negative terminal N. Similarly, while the power control unit 20b of FIG. 1 is connected between the intermediate and negative terminals O and N, the power control unit 20b of this embodiment is connected between the positive terminal P and the intermediate terminal O. In other words, the positions of power control units 20a and 20b are interchanged.

The structural differences as above described are due from the fact that the circuit shown in FIG. 1 is for use with a d.c. power control device while the circuit shown in FIG. 4 is for use with a d.c. power regenerative control device. In other respects, the circuit illustrated in FIG. 4 is identical to that shown in FIG. 1. Therefore, it will be readily understood that the circuit of FIG. 1 can be easily modified to form the circuit of FIG. 4 by employing any suitable switching means, thereby to provide a single d.c. power control circuit capable of selectively performing both the normal d.c. power control and d.c. power regenerative control.

When the switching element 44 of the switching device 40' is placed in its ON state, the motors 30a and 30b are connected in a series relationship because of the diodes 45a and 45b oriented as illustrated in FIG. 4, as shown schematically in FIG. 2a. In this case, the current generated from the motors 30a and 30b flows in the direction of the arrow shown in dash lines in FIG. 2a. Then, the choppers 21a and 21b are operated similarly as in the case of the circuit shown in FIG. 1 to successively provide four modes of the circuit connection previously described. Therefore, the mean electrical potential at the end terminal Qb is controlled in accordance with the current carrying ratio of the chopper 21b within the higher half part of the total source voltage, while the mean electric potential at the end terminal Qa is controlled in accordance with the current carrying ratio of the chopper 21a within the lower half part of the source voltage. Therefore, the voltage across the end terminals Qa and Qb is controlled within the full range of from 0 voltage to the full source voltage. In other words, the load regenerative voltage is controlled within the range of from 0 to one-half of the total voltage for each of the motors 30a and 30b of the series connected motors.

When the switching element 44 is placed in its OFF state, the motors 30a and 30b are placed in a parallel relationship through the diodes 45a and 45b as schematically shown in FIG. 2b. In such the case, since the diodes 45a and 45b permit the current to flow therethrough, the current generated from the motors 30a and 30b flows in the direction of the arrows shown in dash lines in FIG. 2b. It should be understood that, in this case, the electromotive force of each of the motors 30a and 30b is equal to or more than one-half of the total voltage of the d.c. power source.

Under these circumstances, the motor 30b is controlled according to a voltage which is the sum of the uncontrollable component of the voltage within the lower half part of the source voltage and the controllable component of the voltage within the higher half part of the source voltage, and the motor 30a is controlled according to a voltage which is the sum of the uncontrollable component of the voltage within the higher half part of the source voltage and the controllable component of the voltage within the lower half part of the source voltage.

Figure 6:
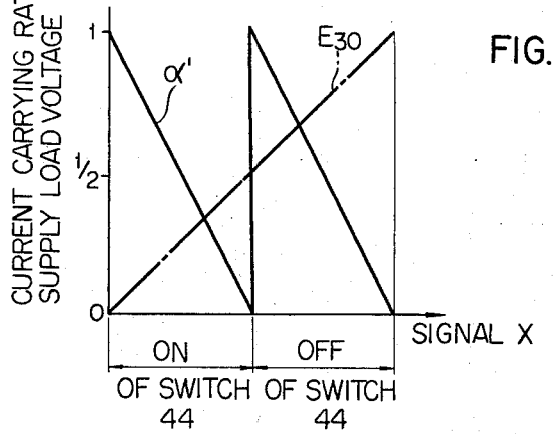
FIG. 6 is a control characteristic diagram for explaining the operation of the d.c. power regenerative control device of FIG. 4.

On the other hand, in order to switch the connections from those shown in FIG. 2a to those shown in FIG. 2b, it is only required to instantaneously turn the switching element 44 from its OFF state to its ON state at the time at which the total electromotive force of the motors 30a and 30b becomes equal to one half of the full voltage. The turning ON and OFF of the switching element 44 and the variation in the current carrying ratios of the choppers 21a and 21b are performed as shown in FIG. 6. The current carrying ratio α' of the choppers 21a and 21b gradually decreases from 1 to 0 while the switching element 44 is in its ON state, thereby to control the load voltage $E_{30}$ from 0 to one-half of the source voltage. This is because, for the regenerative power control, the motor voltage increases as the current carrying ratio $\alpha'$ of the choppers 21a and 21b decreases. Upon turning OFF the switching element 44, i.e., upon switching the control range of the load voltage, the current carrying ratio $\alpha'$ of the choppers 21a and 21b is almost instantaneously reset from 0 to 1 by any suitable control means as previously described in conjunction with FIG. 3. Thereafter, the current carrying ratio $\alpha'$ of the choppers again gradually decreases from 1 to 0, thereby to control the load voltage $E_{30}$ from one-half to the total source voltage during the time the switching element 44 is OFF. Therefore, the voltage control operation can be performed continuously as shown by a dot-and-dash line in FIG. 6 labelled by the reference character $E_{30}$. Thus the continuous transfer between the voltage control ranges with respect to the motors 30a and 30b can be performed.

Upon opening and closing of the switching element 44, since the load current flowing through the switching element 44 can automatically commutate to flow through the diodes 45a and 45b and vice versa, the electrical connection can be smoothly changed between the conditions while the load current flows continuously.

Figure 5:
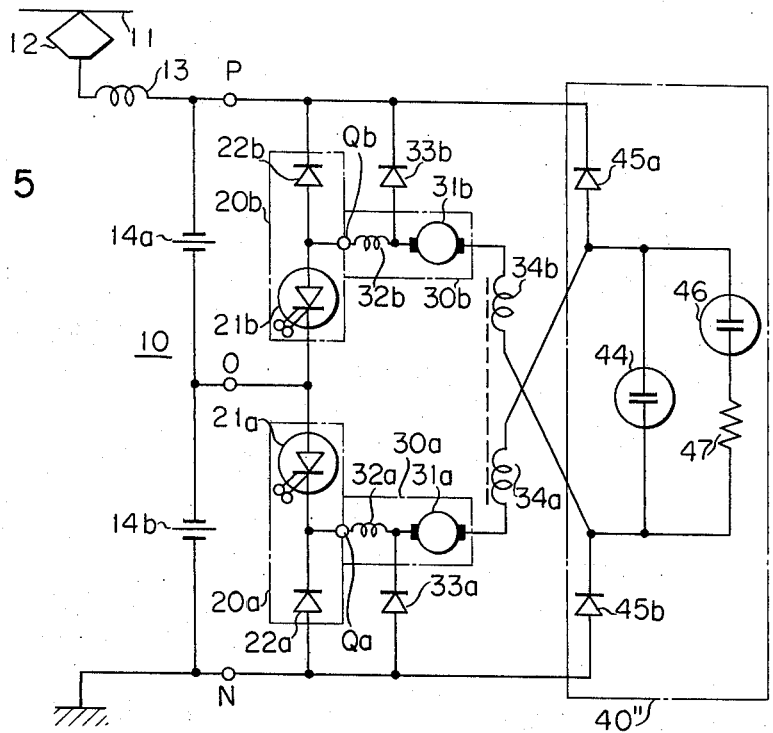

Referring now to FIG. 5, wherein still another embodiment of the present invention as applied to a d.c. power regenerative control device is illustrated, it is seen that the circuit is substantially the same as that illustrated in FIG. 4. One of the difference between two circuits shown in FIGS. 4 and 5 is that the motors 30a and 30b of FIG. 5 are designated as being series self-exciting type motors each including a series connected armature 31a or 31b and field winding 32a and 32b. The points of the circuits between the armature 31a and the field winding 32a and between the armature 31b and the field winding 32b are connected to the negative terminal N and the positive terminal P respectively through the respective diodes 33a and 33b.

Another difference is in the switching device 10''. More specifically, in parallel with the switching element 44, there is connected a series connected further switching element 46 and a starting rheostat 47.

In addition, the circuit shown in FIG. 5 is provided with a pair of current limiting reactors 34a and 34b between the armature 31a and the diode 45a and the armature 31b and the diode 45b respectively. In other respects, the circuit arrangement of FIG. 5 is identical to that shown in FIG. 4.

To start a typical series generator, it is required that it be started with the generators connected in series as shown in FIG. 2a because the electromotive force necessary for starting the series generator is not established at the beginning of the regenerative braking operation of the series generator. Once the current begins to flow therethrough and the electromotive force is established, the series generator, which is a series self-exciting type generator, sharply increases in voltage. On the other hand, in a high speed operation, since the induced electromotive force is high, the circuit is required to be connected as illustrated in FIG. 2b for the voltage thus established. In other words, the series generator should be switched from the circuit connection shown in FIG. 2a to that shown in FIG. 2b. The speed of increase of the electromotive force as above described is very high with the self-exciting series generator, so that it is almost impossible to carry out the switching operation between the two circuit connections following the increase in the electromotive force employing, for example the switching element 44 alone.

The d.c. power regenerative control device shown in FIG. 5 is designed to overcome this difficulty. Upon the regenerative starting, the switching element 46 is placed in its ON State and the switching element 44 in its OFF state, whereby the loads are connected in series through the resistor 47 as schematically illustrated in FIG. 2a. As in the case of the circuit shown in FIGS. 1 and 4, the choppers 21a and 21b of the power control units 20a and 20b are controlled with respect to their current carrying ratios, thereby to establish a stable motor current.

When the voltage for each of the motors 30a and 30b becomes equal to or more than one half of the total source voltage, the switching element 46 is changed to its OFF state, thereby to change the circuit connection to that shown in FIG. 2b. On the other hand, when the voltage for each of the motors 30a and 30b becomes less than one half of the total source voltage, the switching element 44 is changed to its ON state, thereby to change the circuit connection to that shown in FIG. 2a.

According to the present invention, as understood from the foregoing description, power control for motors or generators, or in other words, d.c. power control or d.c. regenerative control, can be continuously performed without introducing an excess current or an abrupt change in current. The invention is also applicable to a series motor or a series generator for controlling it without introducing an excess current or an abrupt change in current.

What is claimed is:

1. A d.c. power control device comprising a d.c. power source having three output terminals including an intermediate terminal, the potential at said intermediate terminal having a value intermediate the values of the other of said three output terminals, a first d.c. power control unit connected between the intermediate terminal and one of the remaining terminals of the d.c. power source and having an output terminal, a second d.c. power control unit connected between the intermediate terminal and the other of the remaining terminals of the d.c. power source and having an output terminal, a first load having one end thereof connected to the output terminal of said first d.c. power control unit, a second load having one end thereof connected to the output terminal of said second d.c. power control unit, and a switching device connected to the other ends of said first and second loads and to the terminals of the d.c. power source other than the intermediate terminal said switching device being capable of selectively connecting the first and second loads in series or in parallel with one another.

2. A d.c. power control device comprising a d.c. power source having a positive terminal, a negative terminal and an intermediate terminal, the potential at said intermediate terminal having a value intermediate the values of the potentials at said positive and negative terminals, a first d.c. power control unit connected between the intermediate and positive terminals and having an output terminal, a second d.c. power control unit connected between the intermediate and negative terminals and having an output terminal, a first load having one end thereof connected to said output terminal of said first d.c. power control unit, a second load having one end thereof connected to said output terminal of said second d.c. power control unit, and a switching device including a first switching element connected between said other end of said second load and said positive terminal, a second switching element connected between said other end of said first load and said negative terminal and a diode connected between said other ends of said first and second loads.

3. A d.c. power control device as claimed in claim 2, further comprising means for controlling said first and second d.c. power control units in response to the switching operation of said first and second switching elements.

4. A d.c. power control device comprising a d.c. power source having a positive terminal, a negative terminal and an intermediate terminal, a first d.c. power control unit connected between the intermediate and negative terminals and having an output terminal, a second d.c. power control unit connected between the intermediate and positive terminals and having an output terminal, a first load having one end thereof connected to said output terminal of said first d.c. power control unit, a second load having one end thereof connected to said output terminal of said second d.c. power control unit, and a switching device including a first diode connected between said the other end of said first load and said positive terminal, a second diode connected between said the other end of said second load said negative terminal, and a switching element connected between said the other ends of said first and second loads.

5. A d.c. power control device as claimed in claim 4, wherein said switching device further includes a further switching element and a resistor connected in series, said series connected further switching device and resistor being connected between said the other ends of said first and second loads in parallel with said first-mentioned switching element.

6. A d.c. power control device as claimed in claim 4, further comprising means for controlling said first and second d.c. power control units in response to the switching operation of said first and second switching elements.

* * * * *